(12) United States Patent
Werner et al.

(10) Patent No.: US 8,793,856 B2
(45) Date of Patent: Aug. 5, 2014

(54) PITCH LINK ALIGNMENT TOOL

(75) Inventors: Amanda Werner, Euless, TX (US);
Dominic Przano, Fort Worth, TX (US);
Geoffrey Latham, Dallas, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 137 days.

(21) Appl. No.: 13/400,522

(22) Filed: Feb. 20, 2012

(65) Prior Publication Data
US 2013/0212853 A1    Aug. 22, 2013

(51) Int. Cl.
*B23P 6/00* (2006.01)
*G01D 21/00* (2006.01)

(52) U.S. Cl.
USPC ............... 29/407.1; 29/402.01; 29/402.03; 29/407.01; 29/407.05; 29/407.09; 33/520; 33/645; 33/655

(58) Field of Classification Search
USPC ............ 29/889.1, 402.01, 402.03–402.08, 29/407.01, 407.04–407.05, 407.09–407.1, 29/464, 271; 33/520, 644–645, 655, 710, 33/712, 783–784, 791–806, 809–812, 533, 33/549, 555, 556–557, 568, 603
See application file for complete search history.

(56) References Cited

U.S. PATENT DOCUMENTS

| | | | |
|---|---|---|---|
| 4,939,848 A | 7/1990 | Armstrong | |
| 5,431,540 A | 7/1995 | Doolin et al. | |
| 5,454,153 A * | 10/1995 | Noel | 29/281.1 |
| 6,397,481 B1 * | 6/2002 | Alvarez et al. | 33/1 M |
| 2008/0276779 A1 * | 11/2008 | Kozina et al. | 83/471.3 |
| 2009/0205404 A1 * | 8/2009 | Swadling | 73/7 |
| 2011/0113640 A1 | 5/2011 | Molina | |
| 2012/0151768 A1 * | 6/2012 | Swadling et al. | 29/889.1 |

FOREIGN PATENT DOCUMENTS

| | | |
|---|---|---|
| DE | 2459543 A1 | 7/1976 |
| GB | 146585 A | 7/1920 |

OTHER PUBLICATIONS

European Search Report for related EP Application No. 12161897.9, Nov. 27, 2012, 8 pages, European Patent Office.
Office Action for related Canadian Patent Application No. 2,806,275, Apr. 8, 2014, 2 pages, Canadian Intellectual Property Office.

* cited by examiner

*Primary Examiner* — Alexander P Taousakis
*Assistant Examiner* — Matthew P Travers
(74) *Attorney, Agent, or Firm* — Klemchuk Kubasta LLP; Shannon W. Bates

(57) ABSTRACT

An alignment tool for a pitch link comprises first and second pitch link retainers, wherein the distance between the retainers is adjustable to accommodate the length of the pitch link; and a measurement system for measuring the displacement of a rod end from an adjustment member of the pitch link, comprising first and second measurement reference points fixedly associated with the first and second retainers, respectively. Another alignment tool for a pitch link comprises first and second retainers having an adjustable distance there between; and a stabilization mechanism for stabilizing the tool on a surface. A method for adjusting and aligning a pitch link, in part comprising the steps of securing the pitch link to the alignment tool; measuring and recording a baseline length displacement of the pitch link; loosening the pitch link jam nuts; and adjusting the pitch link on the alignment tool to match the previously recorded displacement.

16 Claims, 8 Drawing Sheets

PITCH LINK ALIGNMENT TOOL

FIELD OF THE INVENTION

The present disclosure generally relates to a pitch link alignment tool, and more particularly, to a pitch link alignment tool that may be operated by a single user, and that may be used for multiple parallel alignments of various pitch link configurations.

BACKGROUND

A pitch link is a component of a rotary blade control system used to change the pitch of a rotor blade, propeller blade, turbine blade, or the like. Maintenance procedures may require a pitch link to be removed from the control system and its jam nut loosened, which may result in the length of the pitch link, as well as the relative angles of its rod ends, being altered during the process. Because the length and rod end angles of each pitch link may be trigonometrically tied to change in blade pitch, to ensure predictable blade control, the pitch link should be returned to its prior configuration before being reinstalled into the control system. Maintenance personnel generally use a tool to loosen a pitch link jam nut during its removal from the control system, and generally use a tool to restore the pitch link to its original on-aircraft length and rod end angle alignment before reinstalling the pitch link into the control system.

SUMMARY

Embodiments of the present disclosure generally provide alignment tools for a pitch link and a method for adjusting and aligning the pitch link.

The present disclosure is directed to an alignment tool for a pitch link having a first rod end, a second rod end, and an adjustment member, the alignment tool comprising a first pitch link retainer for receiving the first rod end of the pitch link, and a second pitch link retainer for receiving the second rod end of the pitch link, wherein the distance between the first retainer and the second retainer is adjustable to accommodate the length of the pitch link; and a measurement system for measuring the displacement of the second rod end from the adjustment member, comprising a first measurement reference point fixedly associated with the first retainer, and a second measurement reference point fixedly associated with the second retainer, wherein the displacement between the first measurement reference point and the second measurement reference point may be measured. In an embodiment, the first retainer and the second retainer comprise vertical pegs. In another embodiment the first and second measurement reference points are defined by vertical pins. In yet another embodiment, the alignment tool may have one or more alignment reference points to align a measurement tool at a fixed lateral distance and orientation relative to the first and second measurement reference points.

In various embodiments, one or more of the retainers comprises a clocking block having an angled upper surface for aligning the first rod end at a predetermined angle relative to the second rod end. In an embodiment, the clocking block may be reoriented to correspond with two or more rod end orientations.

In another embodiment, the first retainer is coupled to a stationary body member, the second retainer is coupled to a moveable body member, and the stationary body member and the moveable body member are moveably coupled to adjust the distance between the first retainer and the second retainer. In an embodiment, the tool has a variable length.

In various embodiments, the alignment tool further comprises a stabilization mechanism for stabilizing the tool on a surface. In one embodiment the stabilization mechanism comprises one or more outrigger.

In another aspect, the present disclosure is directed to an alignment tool for a pitch link having a first rod end, a second rod end, and an adjustment member, the alignment tool comprising a first pitch link retainer for receiving the first rod end of the pitch link, and a second pitch link retainer for receiving the second rod end of the pitch link, wherein the distance between the first retainer and the second retainer is adjustable to accommodate the length of the pitch link; and a stabilization mechanism for stabilizing the tool on a surface. In various embodiments, the first and second retainers comprise vertical pegs. In an embodiment, one or more restraining mechanisms are releasably coupled to each peg.

In various embodiments, the stabilization mechanism comprises one or more outrigger. In an embodiment, each outrigger may move between a deployed position being substantially outward from alignment tool, and a withdrawn position being substantially proximate to alignment tool.

In various embodiments one or more of the retainers comprises a clocking block having an angled upper surface for aligning the first rod end at a predetermined angle relative to the second rod end. In one embodiment, the clocking block may be reoriented to corresponde with two or more rod end alignment orientations.

In an embodiment, the first retainer is coupled to a stationary body member, the second retainer is coupled to a moveable body member, and the stationary body member and the moveable body member are movably coupled to adjust the distance between the first retainer and the second retainer. In an embodiment the tool has a variable length.

In another aspect, the present disclosure is directed to a method for adjusting and aligning a pitch link. The method may comprise adjusting an alignment tool to receive the pitch link, securing the pitch link to the alignment tool, measuring a baseline length displacement of the pitch link, recording the baseline measurement, loosening the pitch link jam nuts, removing the pitch link from the alignment tool, adjusting the alignment tool to receive the pitch link, re-securing the pitch link to the alignment tool, and adjusting the pitch link on the alignment tool to match the previously recorded baseline measurement and baseline alignment. In an embodiment, adjusting the alignment tool to receive the pitch link comprises the sub-steps of adjusting the distance between the tool's retainers to correspond with the length of the pitch link, and adjusting the tool's alignment surface to a baseline alignment corresponding with the alignment of the pitch link rod ends. In an embodiment, adjusting the alignment tool to receive the pitch link comprises the sub-steps of adjusting the distance between the retainers to correspond with the length of the pitch link, and adjusting the alignment surface to the baseline alignment.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
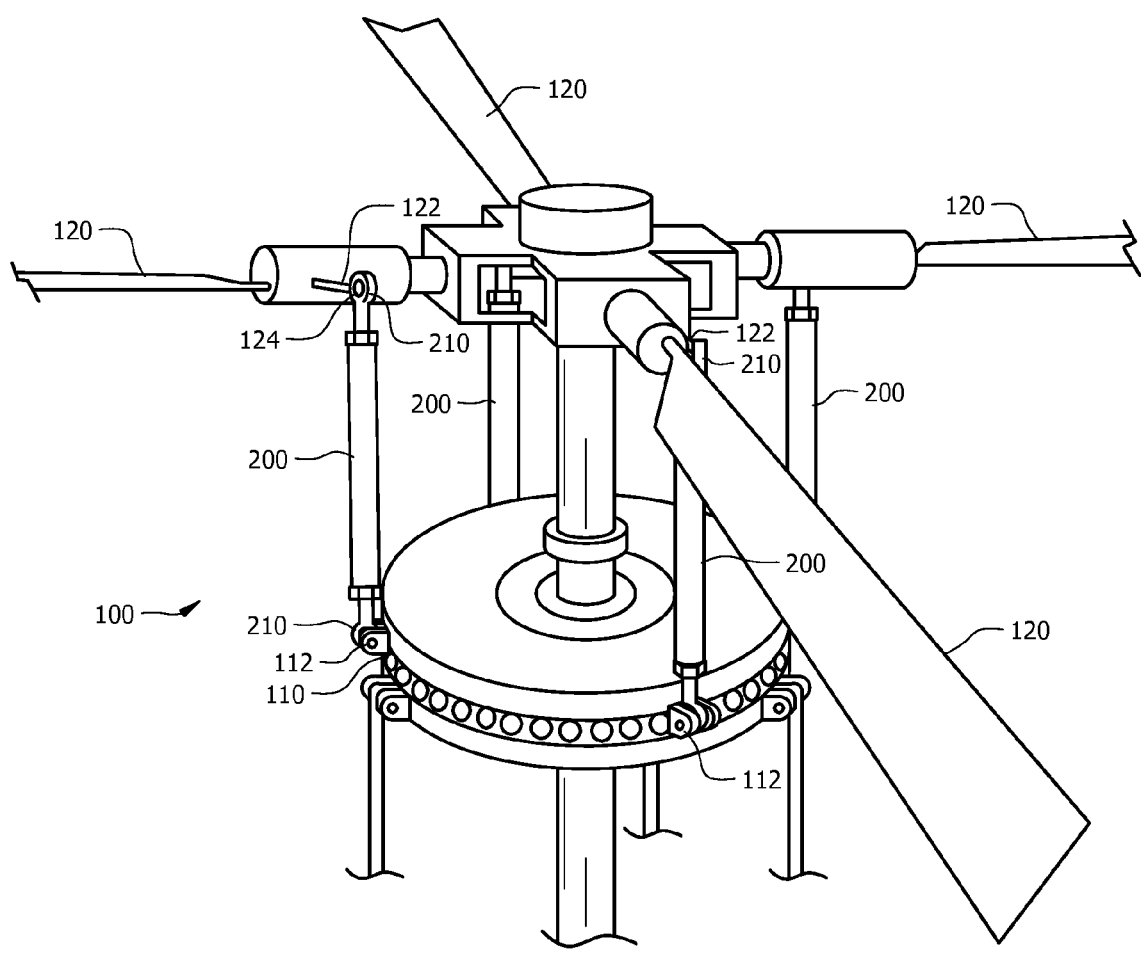
FIG. 1 depicts a perspective view of a rotating blade control system incorporating a plurality of pitch links.

FIG. 1 depicts a rotating blade control system 100 comprising a control plate 110 (also referred to as a swashplate), a plurality of propeller or rotor blades 120, a plurality of pitch horns 122 each associated with one of the blades 120, and a plurality of pitch links 200 each coupled between a pitch horn 122 and the control plate 110. Pitch links 200 are used to change the pitch of the blades 120 on an aircraft or rotorcraft, respectively. Control inputs are communicated from a pilot to the control plate 110, which may respond in turn by rising up, lowering down, tilting, or some combination thereof. Such movement in the control plate 110 causes the various pitch links 200 to move in a corresponding manner to push or pull on the pitch horns 122 and thereby changing the pitch of the blades 120 connected thereto. Blade pitch may be controlled in this or a similar manner to vary the thrust generated by each blade 120. Because the actual change in blade pitch is trigonometrically tied to the length of each pitch link 200 and the position of the control plate 110, it is important to maintain a consistent length for each pitch link 200 to ensure predictable blade control. It is also important to align the angle of each rod end 210 to correspond with the respective angles of the swashplate clevis interface 112 and pitch horn attachment interface 124 so that the pitch link 200 may be properly coupled to the rotating control system 100.

Figure 2:
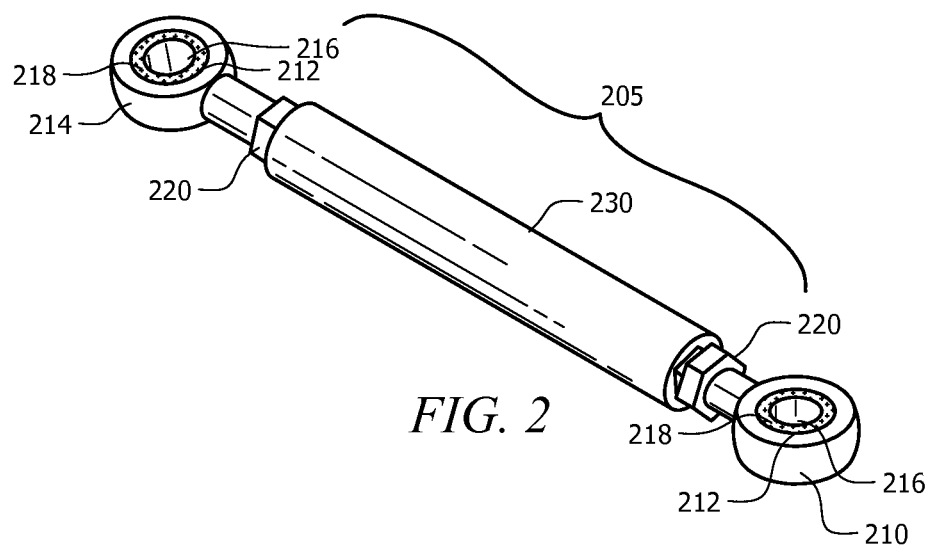
FIG. 2 depicts a top view of a representative pitch link.

FIG. 2 depicts a representative pitch link 200 comprising two rod ends 210 coupled to opposite ends of a pitch link body 205 comprising an adjustment member 220 and a jam nut 230. Rod ends 210 have an inner diameter 212 and an outer diameter 214, defining a generally circular planform with a concentric hole 216 in the middle. A bearing 218 may be disposed within and coupled to inner diameter 212 of rod end 210. The length of the pitch link body 205 may be adjusted by twisting the adjustment member 220—twisting in one direction may lengthen the pitch link body 205, and twisting in the opposite direction may shorten it.

Pitch links 200 may be removed from the control system of an aircraft to perform maintenance, such as to replace their bearings 218. Typically, such maintenance operations include removal of pitch link 200 from control system 100, and removal of rod ends 210 from pitch link 200. To remove rod ends 210 from pitch link 200, the jam nut 230 is loosened, or "broken," which may require 100-120 ft-lb of torque. Therefore, the pitch link 200 is generally first secured to a robust surface to safely break the jam nut 230. Many tools lack the ability to firmly secure pitch link 200 in a fixed location, and thereby pose safety hazards. Additionally, multiple users are often required to operate these tools—sometimes one or more users to hold the pitch link 200 and any tool attached thereto in place, and another user to break the jam nut 230.

After repair, a pitch link 200 should be returned to its original configuration (length and rod end 210 angle alignment) prior to being reinstalled on the aircraft. Conventional alignment tools, once adjusted to secure a given configuration of the pitch link 200, are maintained in the same position until after repairs have been completed. In other words, such conventional alignment tools are each assigned to maintain the configuration of a particular pitch link 200, and each conventional alignment tool is thereby effectively rendered out of commission until repairs on that pitch link 200 are completed. Thus, such tools are unusable with other pitch links 200 in the meantime, which could result in increased repair times if a limited number of alignment tools are available. Similarly, increased costs may be incurred if users purchase, maintain, and store multiple conventional alignment tools so as to reduce repair time.

Embodiments of the present disclosure generally provide an alignment tool for adjusting and aligning a pitch link 200. As detailed herein, the alignment tool is adjustable to accommodate a wide range of pitch link 200 configurations. In various embodiments, the alignment tool may comprise a measurement system for measuring a length displacement of a pitch link, and a stabilization mechanism for stabilizing the tool on a surface.

FIGS. 3-8B illustrate representative configurations of pitch link alignment tool 300 and parts thereof. It should be understood that the components of alignment tool 300 and parts thereof shown in FIGS. 3-8B are for illustrative purposes only, and that any other suitable components or subcomponents may be used in conjunction with or in lieu of the components comprising alignment tool 300 and the parts of alignment tool 300 described herein.

Figure 3:
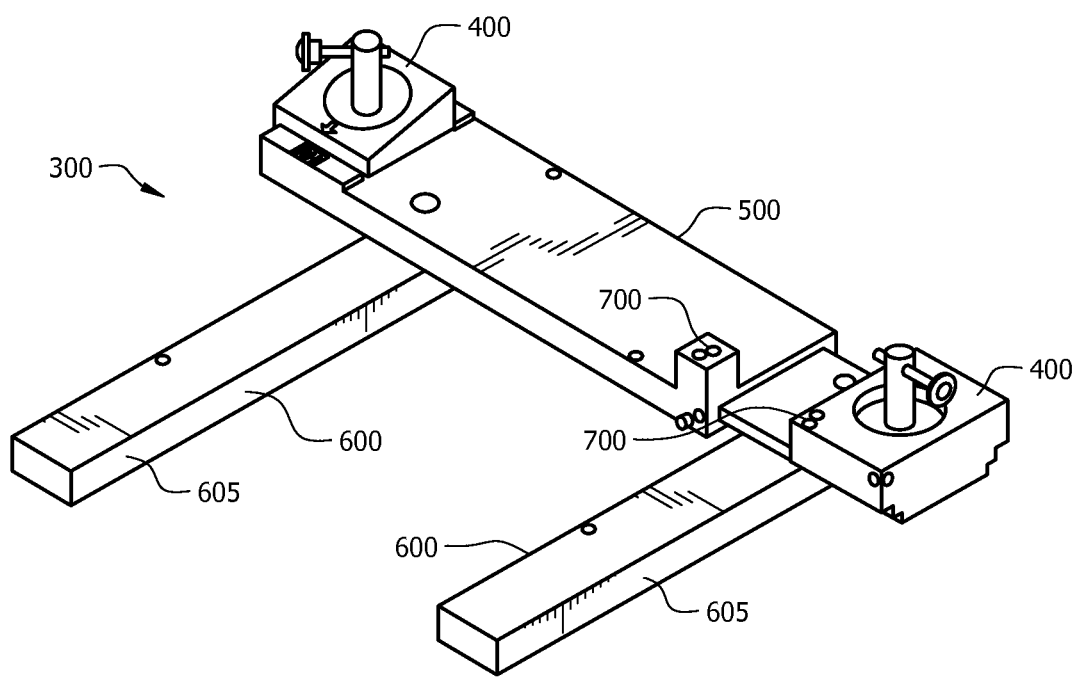
FIG. 3 depicts a perspective view of a pitch link alignment tool according to an embodiment of the present disclosure.

The present disclosure is directed to an alignment tool 300 that facilitates the adjustment and alignment of pitch links 200. Embodiments of alignment tool 300 may enable single user operation, and may enable the alignment of multiple pitch links 200 in parallel. FIG. 3 depicts an embodiment of alignment tool 300 that may comprise pitch link retainers 400 on either end of an alignment tool body 500, a stabilization mechanism 600, and a measurement system 700, as described in more detail herein.

Figure 4A:
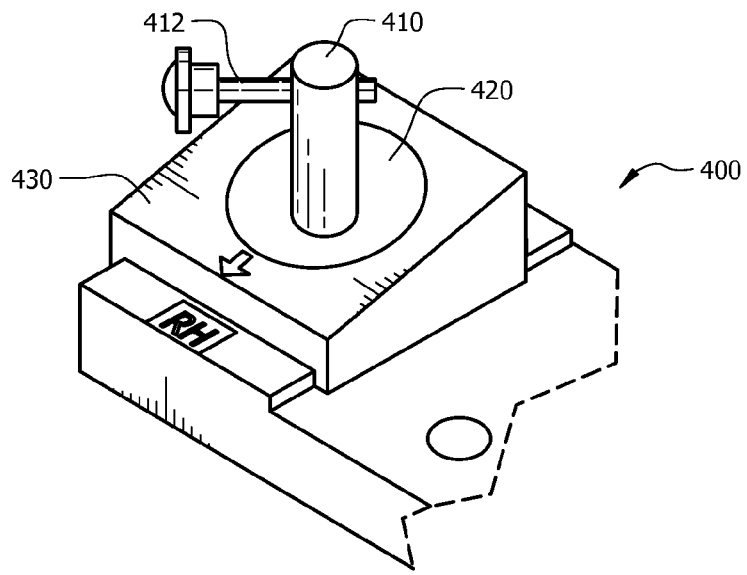
FIG. 4A depicts an enlarged perspective view of a pitch link retainer of the pitch link alignment tool of FIG. 3 according to an embodiment of the present disclosure.

FIG. 4A depicts an enlarged perspective view of one of the pitch link retainers 400 of alignment tool 300. Retainers 400 may be of any suitable size, shape, material, and construction to fixedly secure a pitch link 200 to alignment tool 300. Retainers 400 may improve safety and enable alignment tool 300 to be operated by a single user by fixedly securing a pitch link 200 to alignment tool 300. As shown in FIG. 4A, retainers 400 may comprise a male element 410 such as a peg, a female element 420 such as a recess, a restraining element 412 such as a pin, and an alignment surface 430. Male element 410 may be of any suitable length and diameter to extend through the concentric hole 216 in a pitch link rod end 210, and male element 410 may be fixedly or detachably coupled to surrounding structure of the alignment tool 300. Female element 420 may be of any suitable shape and size to receive and contain at least a portion of a pitch link rod end 210 when coupled to male element 410. Restraining element 412 may be operable to retain a pitch link 200 coupled to alignment tool 300. In particular, after a pitch link rod end 210 is coupled to male element 410, restraining element 412 may be releasably secured to male element 410 to prevent removal of the pitch link 200 from the alignment tool 300 until the restraining element 412 is released. One having ordinary skill in the art will recognize that a multitude of mechanisms may be employed to secure pitch link 200 to pitch link alignment tool 300, and the present disclosure is not limited to the illustrative embodiments described herein. Retainer 400 may further comprise one or more alignment surfaces 430. An alignment surface 430 may be level, or sloped at a predetermined angle, and may be equal to or greater in size than rod end 210. Alignment surface 430 may be oriented to align the angle of a first rod end 210 relative to that of a second rod end 210.

Figure 4B:
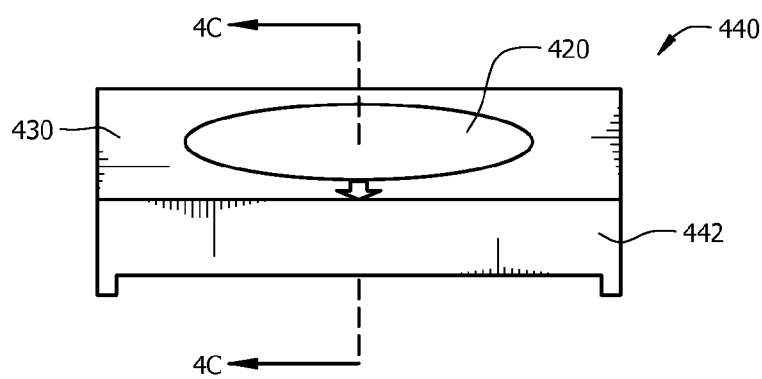
FIG. 4B depicts a side view of a clocking block of a pitch link retainer according to an embodiment of the present disclosure.
Figure 4C:
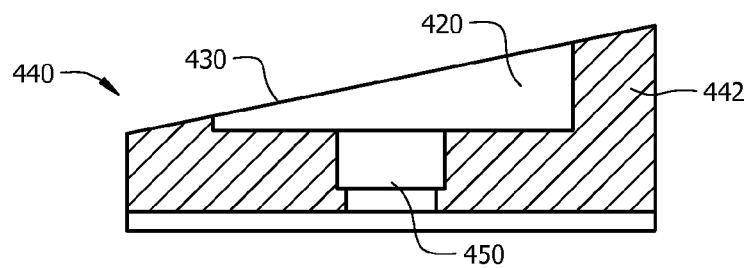
FIG. 4C depicts a cross-sectional view, taken along section line 4C-4C, of a clocking block of the pitch link retainer of FIG. 4B according to an embodiment of the present disclosure.

In an embodiment, retainer 400 may comprise a reversible clocking block, as depicted in FIGS. 4B and 4C. Clocking block 440 may comprise a clocking block body 442 having an upper alignment surface 430. A female element 420 may be recessed within the alignment surface 430 of clocking block 440. A male element 410 (not shown) may be fixedly coupled to clocking block 440 and project from alignment surface 430, or it may be fixedly coupled to body 500 and project through a passage 450 in clocking block 440 and ultimately project outward from alignment surface 430. Clocking block 440 may releasably couple with body 500 of alignment tool 300 in any manner that may prevent clocking block 440 from rotating. In one embodiment, clocking block 440 may be decoupled from body 500 and rotationally reoriented, providing for the clocking block 440 to receive rod ends 210 having opposite orientations using only one alignment surface 430. Body 500 and alignment surface 430 may be marked to visually indicate the direction in which alignment surface 430 should be oriented in order to correspond with predetermined rod end 210 orientations. For example, body 500 may be marked with labels "RH" (shown) and "LH" (not shown) on opposite sides of retainer 400 to correspond with "right-hand" and "left-hand" rod end 210 orientations, and alignment surface 430 may be marked with an arrow. In operation, clocking block 440 may be oriented such that the alignment surface 430 will be properly oriented to receive rod ends 210 having the orientation to which the arrow points. The orientation of clocking block 440 may be changed by lifting clocking block 440 vertically (thereby decoupling it from body 500), rotating the clocking block 440, and recoupling the clocking block 440 in its new orientation to body 500. Clocking block 440 may be coupled to, decoupled from, and be reoriented on alignment tool 300 using a variety of mechanisms known in the art, and the present disclosure should not be limited to the embodiments described herein.

Referring now to FIGS. 5A, 5B, 6A, and 6B, alignment tool 300 may further comprise a body 500. Body 500 broadly comprises any stationary body members 510 and movable body members 520. Body 500 may be of any suitable size, shape, material, and construction to fixedly secure a pitch link 200 to alignment tool 300. In one embodiment, body 500 is substantially rectangular, constructed of aluminum, and is of sufficient dimensions to receive a variety of different types of pitch links 200.

Figure 5A:
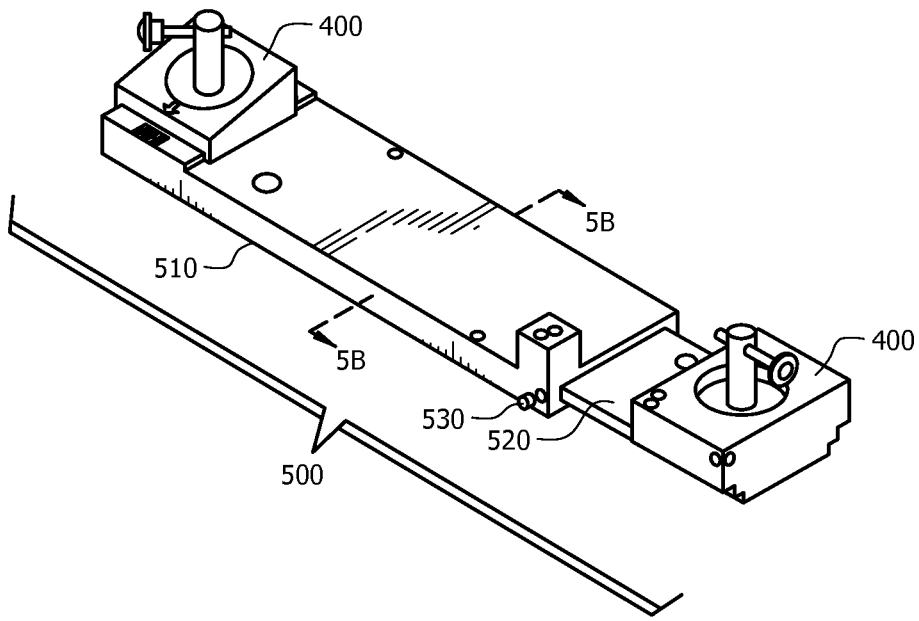
FIG. 5A depicts a perspective view of a pitch link alignment tool having a variable footprint body according to an embodiment of the present disclosure.
Figure 5B:
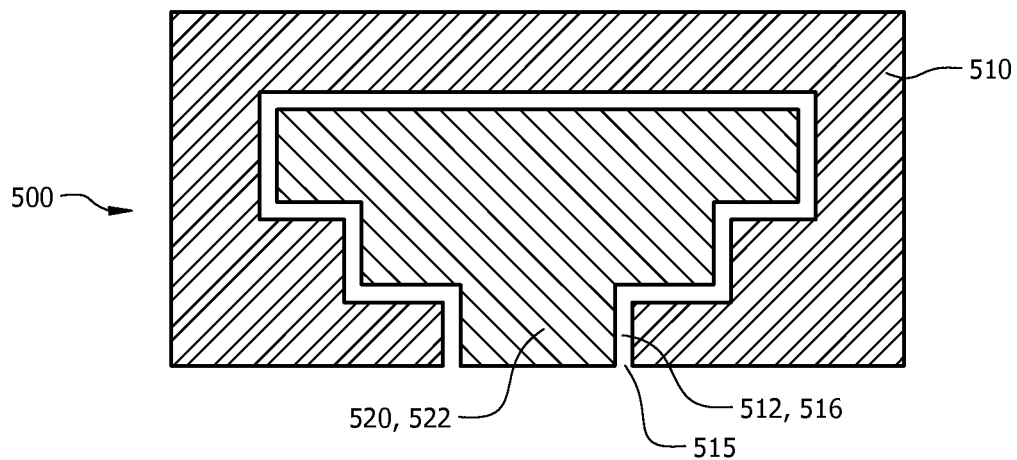
FIG. 5B depicts a cross-sectional view, taken along section line 5B-5B, of the variable footprint body of the pitch link alignment tool of FIG. 5A, the variable footprint body having slidably coupled body members according to an embodiment of the present disclosure.

Referring to FIG. 5A, body 500 may have a variable longitudinal footprint. Embodiments of alignment tool 300 comprising a variable length footprint body 500 as described herein may be more compact and take up less space during operation and storage. In one embodiment, body 500 may comprise a stationary body member 510 and a movable body member 520. These body members 510 and 520 may be coupled for translation in opposite directions, resulting in an expansion or a contraction in the length of body 500. One having ordinary skill in the art will recognize that this coupling may be achieved using a variety of mechanisms including, but not limited to, a sliding track assembly or a telescoping assembly. In an embodiment, as shown in cross-section in FIG. 5B, a moveable body member 520 having a stair-stepped, generally T-shaped cross section 522 may be slideably disposed within a recess 512 within stationary body member 510, the recess 512 comprising a stair-stepped, generally T-shaped cross section 516 with an opening 515 at a lower end thereof. Such a construction leaves the bottom of alignment tool 300 open, allowing dirt and other particulates to naturally void the moveable coupling assembly. As shown in FIG. 5A, a locking mechanism 530, such as a bolt, may be used to secure movable body member 520 in a fixed position relative to stationary body member 510.

Figure 6A:
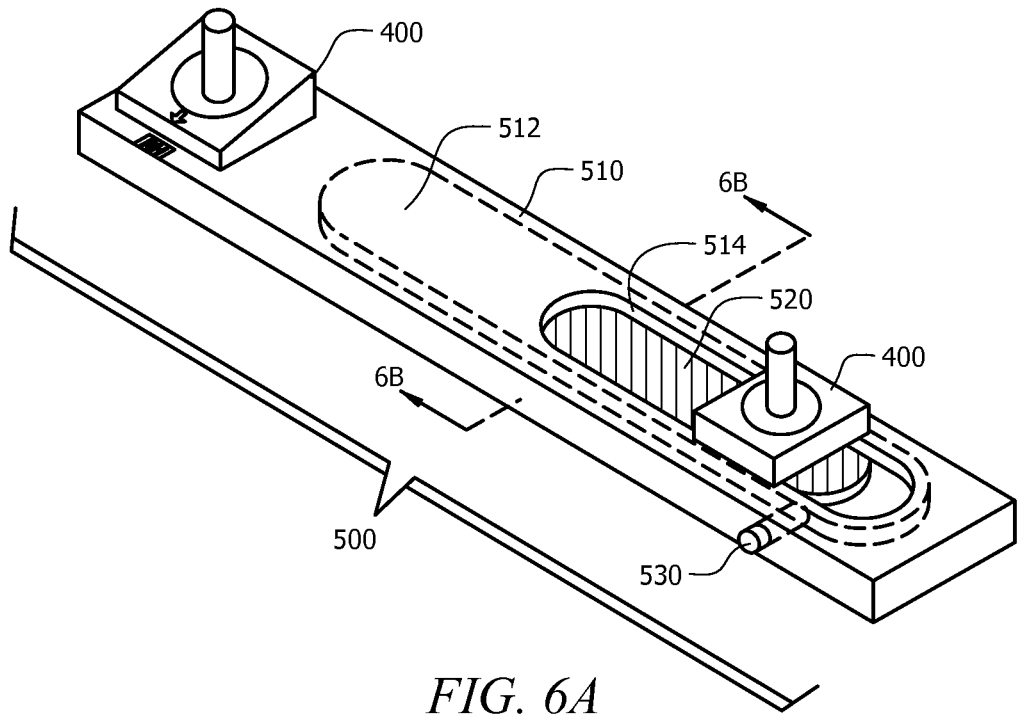
FIG. 6A depicts a perspective view of a pitch link alignment tool having a fixed footprint body according to an embodiment of the present disclosure.
Figure 6B:
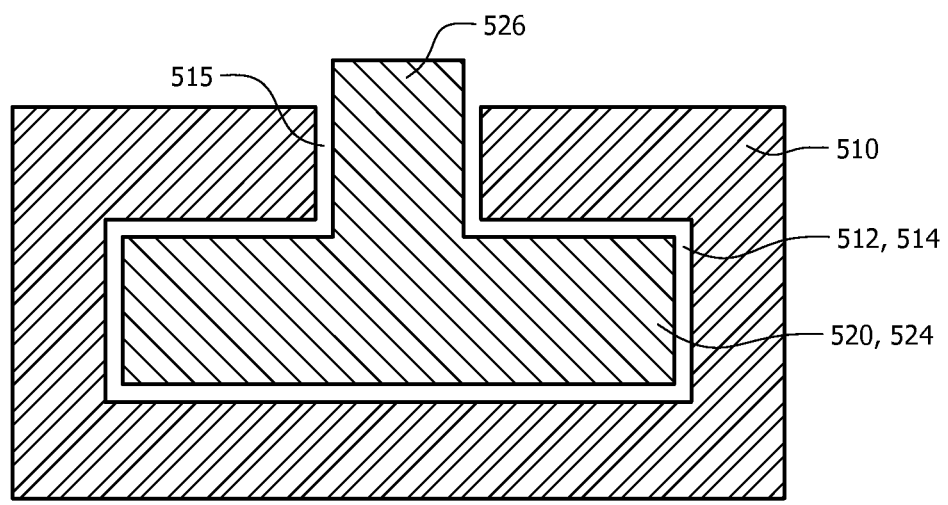
FIG. 6B depicts a cross-sectional view, taken along section line 6B-6B, of the fixed footprint body of the pitch link alignment tool of FIG. 6A, the fixed footprint body having slidably coupled body members according to an embodiment of the present disclosure.

Referring now to FIG. 6A, body 500 may have a constant longitudinal footprint. In one embodiment, body 500 may comprise a stationary body member 510 and a shorter, movable body member 520. Movable body member 520 may be coupled to stationary body member 510 such that it may translate over a predetermined range between the ends of stationary body member 510. One having ordinary skill in the art will recognize that this coupling may be achieved using a variety of mechanisms including, but not limited to, a sliding track assembly or a telescoping assembly. In an embodiment, as shown in cross-section in FIG. 6B, moveable body member 520 having a generally inverted T-shaped cross section 524 may be slideably disposed within a recess 512 within stationary body member 510, the recess 512 comprising a generally inverted T-shaped cross section 514 with an opening 515 at an upper end thereof. The recess 512, 514 may have substantially similar width and height dimensions, and a greater length dimension, than moveable member 520. Such a construction allows for a retainer 400 to couple to a vertical portion 526 of inverted T-shaped movable body member 520, 524, as shown in FIG. 6A, while still allowing moveable body member 520 to translate longitudinally within the recess 512, 514. A locking mechanism 530, such as a bolt, may be used to secure movable body member 520 in a fixed position relative to stationary body member 510.

Retainers 400 may be coupled to body 500 such that the longitudinal distance between the retainers 400 is adjustable. A retainer 400 may be coupled to a stationary body member 510, and another retainer 400 may be coupled to a moveable body member 520, as shown in FIG. 6A. Retainers 400 may be coupled at substantially opposite ends of body 500, or in any other suitable location on body 500. Coupling retainers 400 to substantially opposite ends of body 500 (or to distal ends of coupled members 510 and 520) may increase the range of adjustable distance between retainers 400, and may minimize longitudinal footprint dimension. Retainers 400 may also be located to have substantially similar lateral and vertical positions on tool 300. The space between retainers 400 should be substantially free of obstructions such that a pitch link 200 may be secured therein. One having ordinary skill in the art will recognize that length of body members 510 and 520, as well as the locations of retainers 400, may depend on many design factors including, but not limited to, a desired longitudinal footprint of alignment tool 300, and the length of pitch links 200 for which the tool 300 will be used.

Figure 7A:
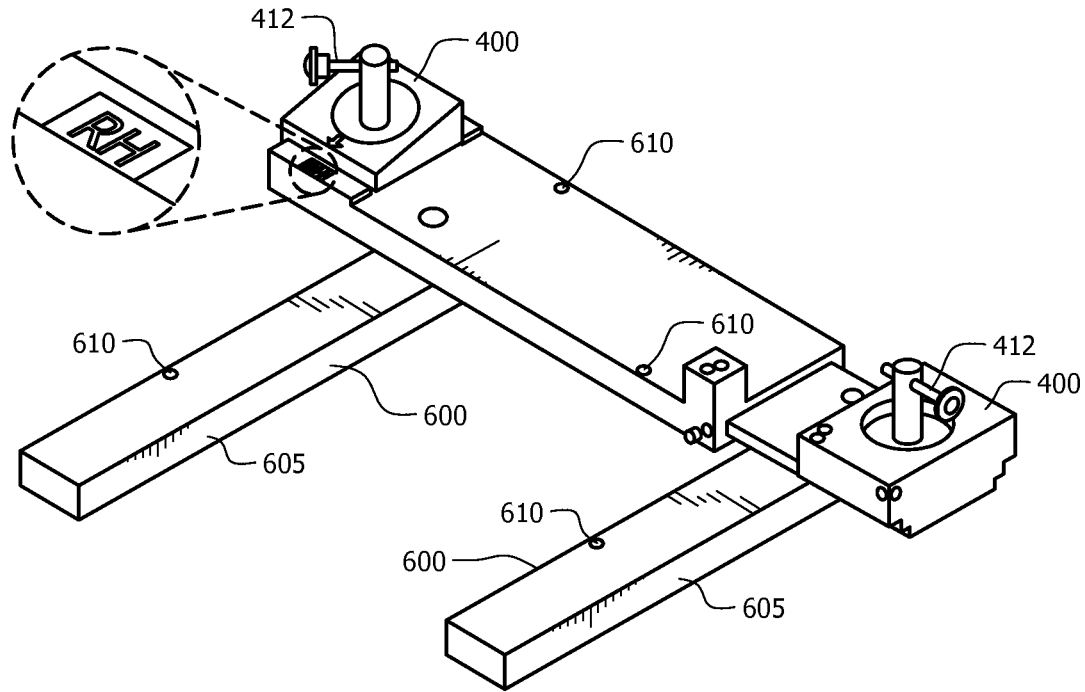
FIG. 7A depicts a perspective view of a pitch link alignment tool having a stabilization mechanism in a deployed position according to an embodiment of the present disclosure.
Figure 7B:
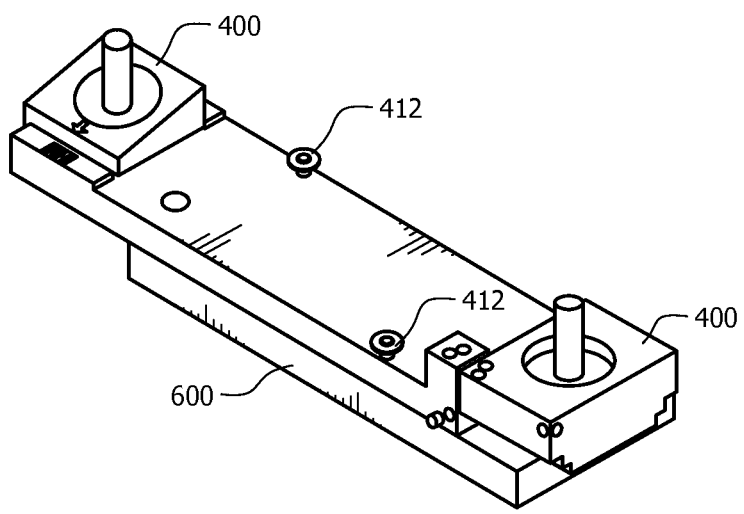
FIG. 7B depicts a perspective view of the pitch link alignment tool of FIG. 7A with the stabilization mechanism secured in a withdrawn position by restraining pins according to an embodiment of the present disclosure.
Figure 7C:
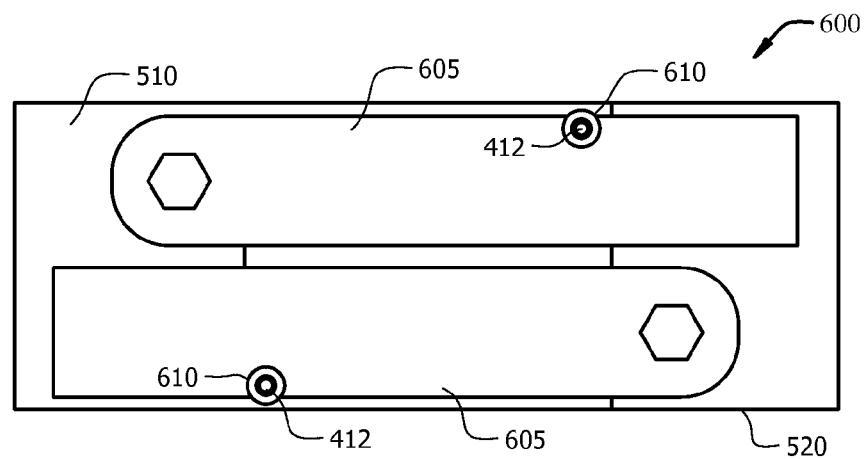
FIG. 7C depicts a bottom view of the pitch link alignment tool of FIG. 7B with the stabilization mechanism secured in a withdrawn position by restraining pins according to an embodiment of the present disclosure.

Referring now to FIG. 7A-7C, alignment tool 300 may further comprise a stabilization mechanism 600 for stabilizing tool 300 on a surface. Stabilization mechanism 600 may improve safety and enable alignment tool 300 to be operated by a single user by resisting moments and forces that may cause alignment tool 300 to shift position or overturn. Stabilization mechanism 600 may be of any suitable size, shape, material, and construction capable of resisting forces and moments that may cause alignment tool 300 to shift position or overturn. In one embodiment, stabilization mechanism comprises one or more outriggers 605. Outrigger 605 may be coupled to body 500 of alignment tool 300, or any other suitable location, and may extend outward from alignment tool 300 in any direction. In one embodiment, an outrigger 605 is coupled to a stationary body member 510, and another outrigger 605 is coupled to a moveable body member 520. Stabilization mechanism 600 may be moveable, providing for deployment during operation of alignment tool 300, such as to the position shown in FIG. 7A, and withdrawal for storage, such as to the position shown in FIG. 7B. Referring now to FIG. 7C, stabilization mechanism 600 may also be retained in a storage position. In one embodiment, body 500 and outriggers 605 comprise vertical passages 610 that may concentrically align in a storage position. Once aligned, pin 412 or a similar mechanism may traverse both passages 610, thereby preventing outriggers 605 from swinging outward.

Figure 8A:
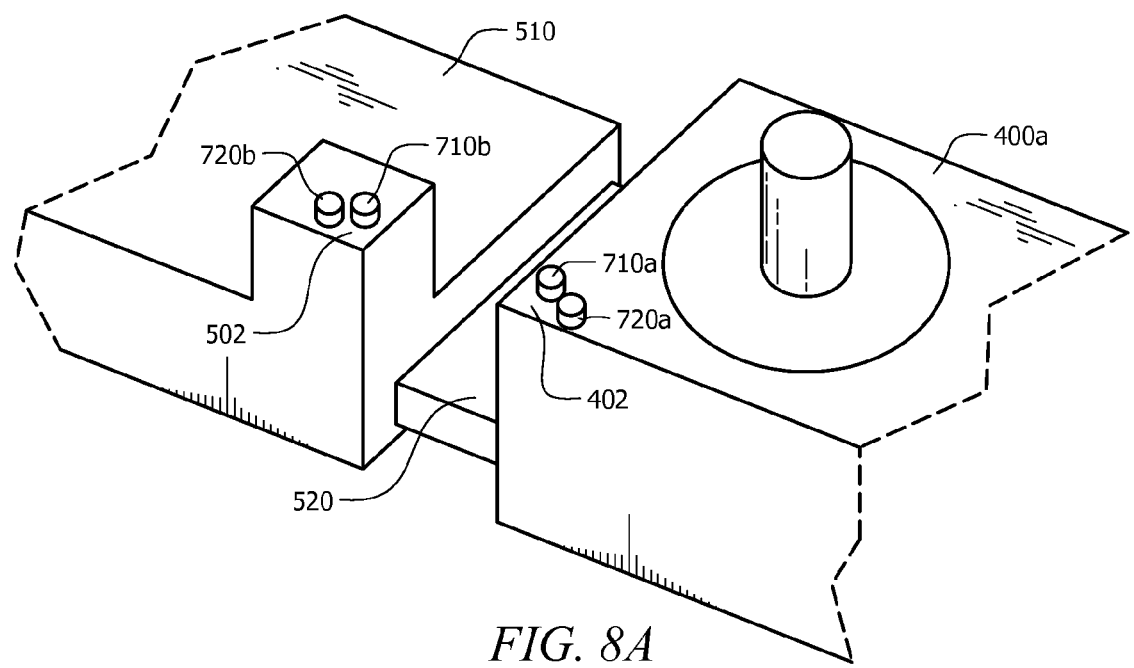
FIG. 8A depicts a perspective view of a measurement system of a pitch link alignment tool, the measurement system having measurement and alignment reference pins according to an embodiment of the present disclosure.
Figure 8B:
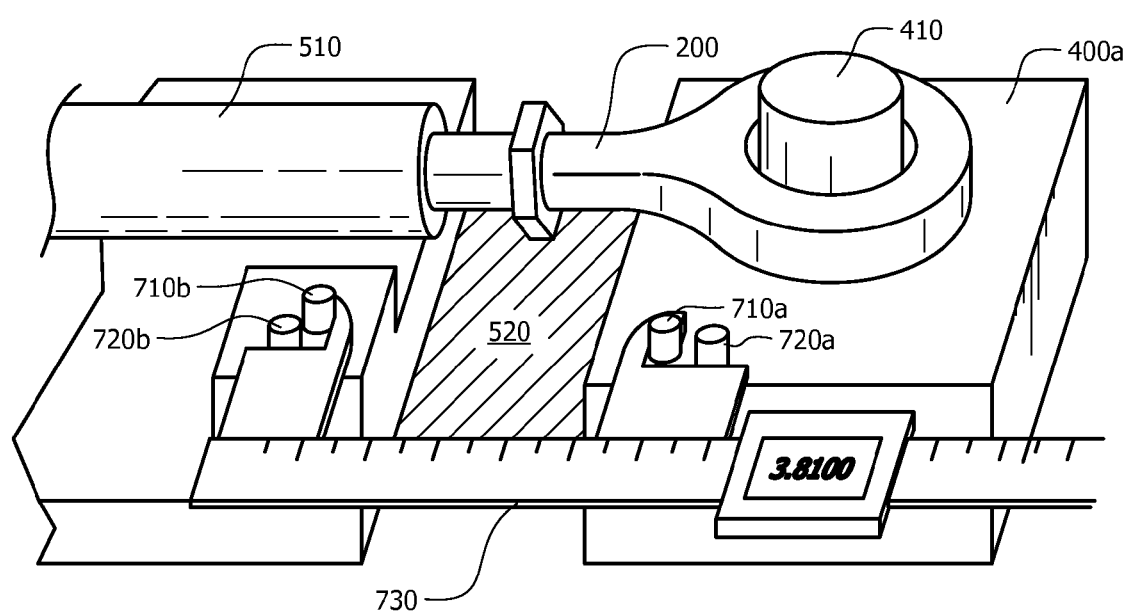
FIG. 8B depicts a perspective view of a pitch link alignment tool with a pitch link disposed thereon, and with a caliper applied to the alignment and measurement reference pins of the measurement system of FIG. 8A according to an embodiment of the present disclosure.

Referring now to FIGS. 8A and 8B, alignment tool 300 may further comprise a measurement system 700. Measurement system 700 may enable the length of a pitch link 200 to be measured consistently and reliably by measuring a corresponding displacement on alignment tool 300. The measurement may be recorded, thereby freeing alignment tool 300 to be used with other pitch links, while ensuring that a given pitch link 200 may be restored to its original length and alignment prior to being reinstalled on an aircraft.

Measurement system 700 may comprise a series of measurement reference points 710 and a series of alignment reference points 720. Using measurement reference points 710, displacement measurements may be taken using any suitable measurement device known in the art. In one embodiment, a measurement reference point 710 is fixedly associated with each retainer 400. Each measurement reference point 710 may be located on or near each retainer 400, or may be associated with other elements of alignment tool 300 fixedly coupled thereto, such as a body member 510 or 520. Regardless, the distance between each measurement reference point 710 and its respective retainer 400 remains fixed.

FIG. 8A illustrates an embodiment comprising a measurement reference point 710a located on inner end 402 of retainer 400a, and a measurement reference point 710b located on inner end 502 of stationary body member 510. If the retainer 400b (not shown) associated with reference point 710b is fixedly coupled to the other end of body member 510, such as the embodiment of alignment tool 300 shown in FIG. 5A, reference point 710b will thereby be fixedly associated with retainer 400b. Even as the distance between the retainers 400a and 400b is adjusted, reference points 710a and 710b remain fixedly associated with retainers 400a and 400b, respectively. In one embodiment, small vertical pins (or any other suitable physical marker) may identify reference points 710. Reference points 710 may be positioned on alignment tool 300 such that they are accessible by a variety of measurement tools.

Still referring to FIG. 8A, measurement system 700 may further comprise a series of alignment reference points 720. Alignment reference points 720 may define a predetermined orientation and position for a measurement tool, thereby improving consistency of measurements. Vertical pins (or any other suitable physical marker) may identify alignment reference points 720. One having ordinary skill in the art will recognize that the locations and arrangement of alignment reference points 720 may depend on the nature of the chosen measurement tool. In one embodiment, each alignment reference point 720 is located proximate to and slightly outboard from an associated measurement reference point 710. FIG. 8A illustrates an embodiment comprising an alignment reference point 720a located on inner end 402 of retainer 400a, proximate to and outboard from associated measurement reference point 710a. Similarly, alignment reference point 720b is located on inner end 502 of stationary body member 510, proximate to and slightly outboard from associated measurement reference point 710b.

Referring to FIG. 8B, a caliper 730 may be placed up against alignment reference points 720a, 720b, thereby setting the caliper 730 in a predetermined position and orientation relative to measurement reference points 710a, 710b. These alignment "anchor points" may thereby ensure that subsequent measurements are taken under consistent conditions.

In operation, pitch link alignment tool 300 may be placed on a working surface, such as a worktable or a floor. A pitch link 200 may then be secured to alignment tool 300 by coupling the pitch link rod ends 210 to the retainers 400 of the alignment tool 300. Preliminary adjustments may be necessary to prepare the alignment tool 300 to receive the pitch link 200. For example, it may be necessary to adjust the distance between retainers 400 to roughly correspond with the length of the pitch link 200 by changing the relative displacement of moveable body member 520 and stationary body member 510. Additionally, it may be necessary to adjust the rotational orientation of clocking block 440 such that alignment surface 430 may correspond with the desired alignment orientation of rod ends 210. Pitch link 200 may then be secured to alignment tool 300 by coupling each rod end 210 to each of retainers 400. If a retainer 400 comprises a male member 410, it may be inserted through the inner diameter of a rod end 210. If a retainer 400 comprises a female member 420, a rod end 210 may be secured within the recess defined by female member 420. Any additional elements of retainer 400, such as restraining pins 412, may also be engaged to improve safety and enable the tool 300 to be used by a single user.

Once the pitch link 200 is secured, the pitch link alignment tool 300 holds the pitch link 200 in place while the jam nut 230 is "broken", or released, by applying a large amount of torque to the adjustment member 220 using a wrench or similar tool. Alignment tool 300 may be stabilized while the jam nut 230 is broken, or subsequently retightened, by securely coupling it to the surface using any suitable device, such as one or more clamps. If the surface is not conducive to securing the tool 300 using available devices, alternative means may be employed to secure the tool 300 to the surface. Stabilization mechanism 600 may be deployed, such as by moving outriggers 605 to the position shown in FIG. 7A, for example, to stabilize tool 300 on the surface, thereby improving safety and enabling a single user to operate the tool 300. In an embodiment, the user may stand on outriggers 605 or apply another type of weight to outriggers 605 to further stabilize the alignment tool 300. Once the jam nut 230 has been loosened, the pitch link 200 may be removed from the alignment tool 300 for maintenance.

Prior to breaking the jam nut 230, however, a user may wish to record a baseline displacement of the pitch link 200 using measurement system 700. Doing so may allow alignment tool 300 to be used for multiple parallel maintenance sessions with various pitch links, rather than having to perform maintenance sessions in series. For example, when a baseline displacement measurement is taken and recorded against an identifying serial number or other designation for a particular pitch link 200, a user may subsequently break the jam nut 230, remove the pitch link 200 from alignment tool 300 for maintenance, and then repeat the process for other pitch links having different configurations using the same tool 300.

When maintenance on a given pitch link 200 is complete, a user may recall the recorded baseline displacement of that particular pitch link 200, and adjust its length to correspond with its baseline displacement. However, if the baseline displacement is not measured and recorded prior to loosening its jam nut 230, the pitch link alignment tool 300 would have to remain out of commission, in a correspondingly fixed position, to ensure that the pitch link 200 could be restored to its original displacement prior to maintenance. Accordingly, the alignment tool 300 would be out of commission for the entire time a given pitch link 200 is off-aircraft, rather than being available to loosen and realign multiple pitch links 200 in parallel.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An alignment tool for a pitch link having a first rod end, a second rod end, and an adjustment member, the alignment tool comprising:
    a first pitch link retainer for receiving the first rod end of the pitch link, and a second pitch link retainer for receiving the second rod end of the pitch link, wherein each of the first and second retainers comprises an alignment surface, and wherein the distance between the first retainer and the second retainer is adjustable to accommodate the length of the pitch link; and
    a measurement system for measuring the displacement of the second rod end from the adjustment member, comprising a first measurement reference point fixedly associated with the first retainer, and a second measurement reference point fixedly associated with the second retainer, wherein the displacement between the first measurement reference point and the second measurement reference point may be measured;
    wherein the alignment surfaces are oriented at different angles relative to one another and are configured to align the first rod end at a predetermined angle relative to the second rod end; and
    wherein the overall length of the alignment tool is variable.

2. An alignment tool according to claim 1, wherein the first retainer and the second retainer comprise vertical pegs.

3. An alignment tool according to claim 1, wherein the first and second measurement reference points are defined by vertical pins.

4. An alignment tool according to claim 1, having one or more alignment reference points to align a measurement tool at a fixed lateral distance and orientation relative to the first and second measurement reference points.

5. An alignment tool according to claim 1, wherein one or more of the retainers comprises a clocking block.

6. An alignment tool according to claim 5, wherein the clocking block may be rotatably reoriented to correspond with two or more rod end alignment orientations.

7. An alignment tool according to claim 1, wherein the first retainer is coupled to a stationary body member, the second retainer is coupled to a movable body member, and the stationary body member and the moveable body member are movably coupled to adjust the distance between the first retainer and the second retainer.

8. An alignment tool according to claim 1, having a stabilization mechanism for stabilizing the tool on a surface.

9. An alignment tool according to claim 8, wherein the stabilization mechanism comprises one or more outriggers.

10. An alignment tool for a pitch link having a first rod end, a second rod end, and an adjustment member, the alignment tool comprising:
    a first pitch link retainer for receiving the first rod end of the pitch link, and a second pitch link retainer for receiving the second rod end of the pitch link, wherein the distance between the first retainer and the second retainer is adjustable to accommodate the length of the pitch link;
    a stabilization mechanism comprising one or more outriggers for stabilizing the tool on a surface and counteracting moments about an axis running between the first and second retainers associated with loosening or tightening a jam nut of the pitch link on the alignment tool;
    wherein the stabilization mechanism extends away from the axis and wherein each outrigger may move between a deployed position being substantially outward from the alignment tool, and a withdrawn position being substantially proximate to the alignment tool; and wherein the overall length of the alignment tool is variable.

11. An alignment tool according to claim 10, wherein the first retainer and the second retainer comprise vertical pegs.

12. An alignment tool according to claim 11, having one or more restraining mechanisms releasably coupled to each peg.

13. An alignment tool according to claim 10, wherein one or more of the retainers comprises a clocking block having an angled upper surface for aligning the first rod end at a predetermined angle relative to the second rod end.

14. An alignment tool according to claim 13, wherein the clocking block may be rotationally reoriented to correspond with two or more rod end alignment orientations.

15. An alignment tool according to claim 10, wherein the first retainer is coupled to a stationary body member, the second retainer is coupled to a movable body member, and the stationary body member and the moveable body member are movably coupled to adjust the distance between the first retainer and the second retainer.

16. A method for adjusting and aligning a pitch link having a first rod end, a second rod end, and one or more jam nuts, comprising the steps of:

adjusting an alignment tool having a variable overall length to receive the pitch link, comprising the sub-steps of:

adjusting the distance between retainers of the alignment tool to correspond with the length of the pitch link; and adjusting an alignment surface of the alignment tool to a baseline alignment corresponding with the alignment of the pitch link rod ends;

securing the pitch link to the alignment tool;

measuring a baseline length displacement of the pitch link;

recording the baseline measurement;

loosening the pitch link jam nuts with the pitch link secured to the alignment tool;

removing the pitch link from the alignment tool;

adjusting the alignment tool to receive the pitch link, comprising the sub-steps of:

adjusting the distance between the retainers to correspond with the length of the pitch link;

adjusting the alignment surface to the baseline alignment;

re-securing the pitch link to the alignment tool;

adjusting the pitch link on the alignment tool to match the previously recorded baseline measurement and baseline alignment.

\* \* \* \* \*